(No Model.)

J. W. SMITH.
LIGHTNING ROD AND COUPLING.

No. 518,793. Patented Apr. 24, 1894.

Witnesses:
P. R. Richards.
Chas. Hultgren

Inventor:
John W. Smith,
By W. B. Richards,
his Atty.

UNITED STATES PATENT OFFICE.

JOHN W. SMITH, OF GALESBURG, ILLINOIS.

LIGHTNING-ROD AND COUPLING.

SPECIFICATION forming part of Letters Patent No. 518,793, dated April 24, 1894.

Application filed January 6, 1893. Serial No. 457,512. (No model.)

*To all whom it may concern:*

Be it known that I, JOHN W. SMITH, a citizen of the United States, residing at Galesburg, in the county of Knox and State of Illinois, have invented certain new and useful Improvements in Lightning-Rods and Couplings, of which the following is a specification.

While this invention relates generally to improvements in lightning rods, the improvement pertains particularly to the couplings or manner in which sections of rods are united to form rods of any desired length.

The object of the invention is to produce a lightning rod coupling of maximum efficiency and strength, which at the same time will be simple in structure, easily operated in coupling and uncoupling, and economic of manufacture.

With these ends in view my invention consists in certain novel structural peculiarities and relative disposition of the parts, as will be hereinafter fully described, and be expressed in the claims hereto appended.

A coupling embodying the structural peculiarities of the different parts of my improvement, and showing their disposition in the completed coupling, is illustrated in the accompanying drawings, in which—

Figure 1:
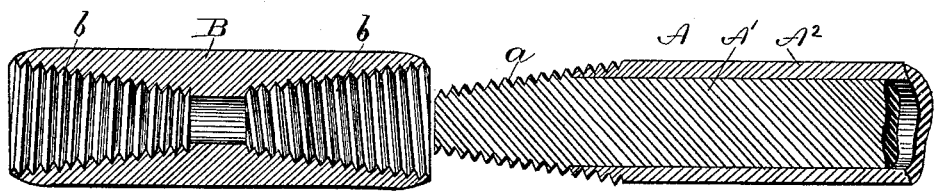
Figure 2:
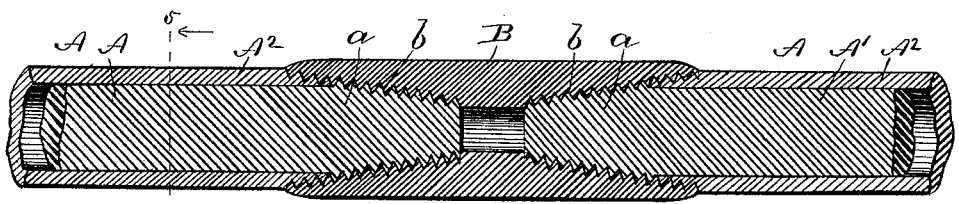
Figure 3:
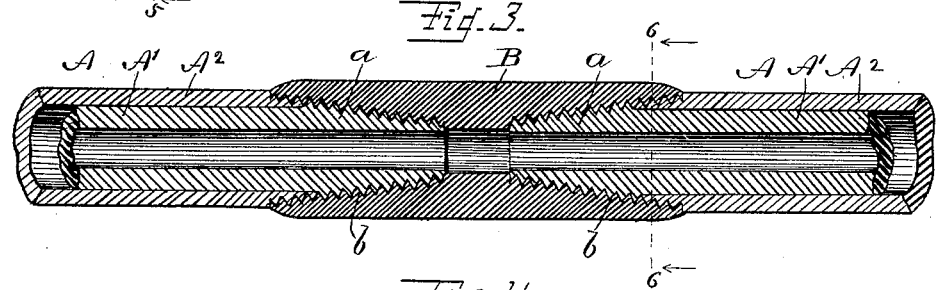
Figure 4:
Figure 5:
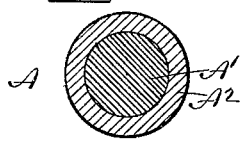
Figure 6:
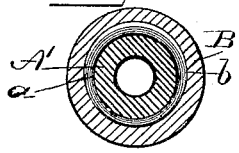

Figure 1 is an axial section of a coupling piece, or sleeve, and one end of a section of rod, showing the construction of these parts seen separate from each other; Fig. 2, an axial section of the adjacent ends of two sections of solid rod coupled together; Fig. 3, an axial section of the adjacent ends of two sections of tubular rod coupled together; Fig. 4, a plan, showing the adjacent ends of two sections of rod coupled together; Fig. 5, a sectional elevation in the line 5, 5, in Fig. 2; Fig. 6, a sectional elevation in the line 6, 6, in Fig. 4.

In the several figures of the drawings, the same part or corresponding part is designated by the same reference letter.

The sections of rod A are composed of a core A', which may be of solid metal, as shown at Figs. 1, 2 and 5, or tubular metal, as shown at Figs. 3 and 6, and which may be steel, iron or other suitable material, within an enveloping tube $A^2$, preferably of copper, but which may be of any other suitable metal of superior conducting power.

The coupling piece, or sleeve, B is preferably of copper, but may also be of any other suitable metal of superior conducting power.

The ends $a$ of the sections A are conical in form and screw threaded, the screw threads extending, as shown, well back onto the conical or tapering end of the copper covering, or enveloping tube $A^2$, and the tube A should be of sufficient thickness to permit of so extending the screw threads thereunto. The copper enveloping tube, preferably should be well fixed on the core, and this may be done in any way preferred. The coupling sleeve B, is tubular, and is preferably of somewhat greater diameter than the sections A of rod. The interiors $b$ of the ends of the sleeve B have a conformity of outline with the tapered or conical ends of the sections A of rod, and are screw threaded to permit screwing the conical ends $a$ thereinto, as shown, and in such manner that the ends of the copper sleeve will extend well over and onto the conical or tapering end of the copper envelope $A^2$, and thereby produce an extended surface contact between the copper sleeve and copper envelope $A^2$ and secure unobstructed efficiency of conducting power at the coupling, while at the same time providing a very strong and simple coupling and which will protect the end of the copper envelope $A^2$.

I have shown in the drawings a core A', and a copper envelope $A^2$, which are cylindrical in their cross sections, but I desire to be understood as considering the scope of my invention as covering not only a rod having these parts cylindrical in their cross sections, but of any other form in their cross sections, in which the described novel principle of construction may be embodied, that is, a construction in which the sections of rod consist of a core covered with copper or other metal of superior conducting power, and have tapered or conical ends, which tapers extend well upon the conical or tapering end of the copper envelope, and which conical ends are seated in a coupling sleeve of copper or other metal with superior conducting power, provided with sockets which have a conformity of outline with the conical ends of the sections of rod and extend when seated thereon well on to the conical or tapering end of the copper envelopes of the rod sections.

The advantages arising from the coupling sleeve extending well over and onto the conical or tapering end of the copper covering $A^2$ are not only that it affords an extended surface contact between these conducting parts of the rod, but also that the heavier sleeve, extending as it does over the copper covering $A^2$ affords a complete protection to the end of the covering, which is not protected and liable to be torn partially or entirely loose, when the sleeve is connected with the covering by abutting ends.

The manner of utilizing my coupling in making different connections of rod sections, and in mounting points on rods will be evident to any person skilled in the art, and need not be herein particularly described.

Having thus described my invention, what I claim as new, and desire to secure by Letters Patent, is—

1. A lightning rod, comprising sections of rod formed of a core of steel, or iron, or other suitable metal, having an enveloping tube of copper, or other metal of superior conducting power, said sections of rods having conical or tapered ends which extend well on to the copper envelope; and a sleeve of copper or other metal having superior conducting power, and provided with socketed ends having a conformity of outline with the conical ends of the rod sections, and extending on to and over the tapered or conical-shaped part of the copper enveloping tube whereby there may be an extended surface contact of the copper of the sleeve and rod section, and thereby an adaptation of structure to function, substantially as described.

2. A lightning rod, comprising sections of rod A, formed of a core $A'$, and enveloping tube $A^2$, and having tapered or conical screw threaded ends $a$; and coupling sleeve B, with socketed screw threaded ends having a conformity of outline with the conical ends of the sections A of rod, and which seat snugly upon and well on to the conical or tapering ends of the enveloping tube $A^2$, substantially as described.

In testimony whereof I affix my signature in presence of two witnesses.

JOHN W. SMITH.

Witnesses:
 JOSIAH TILDEN,
 H. M. RICHARDS.